April 16, 1957
E. A. EBERT
2,789,200
AIR TEMPERING DEVICE
Filed May 19, 1955
3 Sheets-Sheet 1
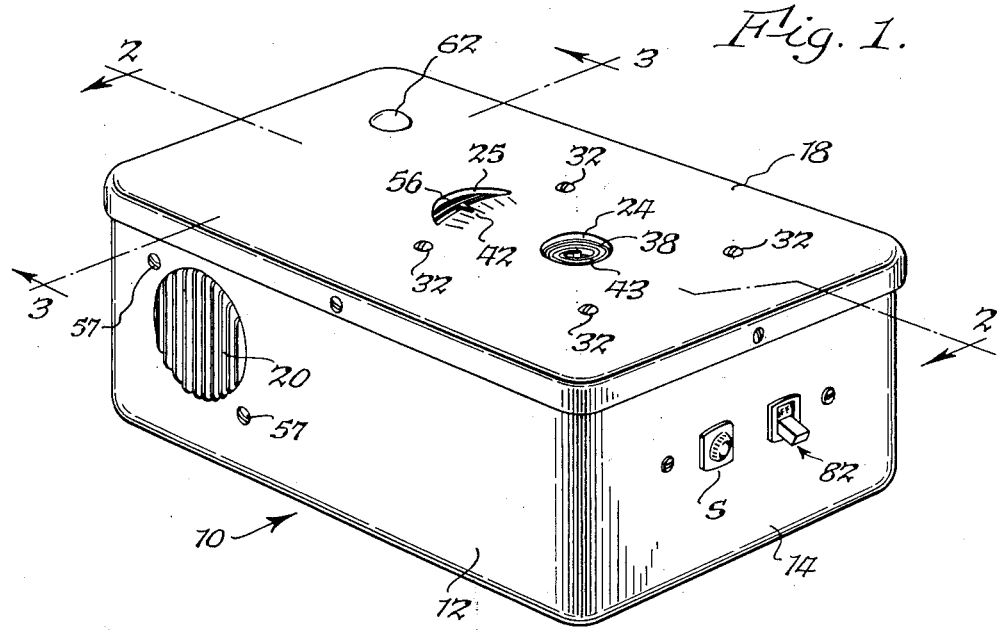
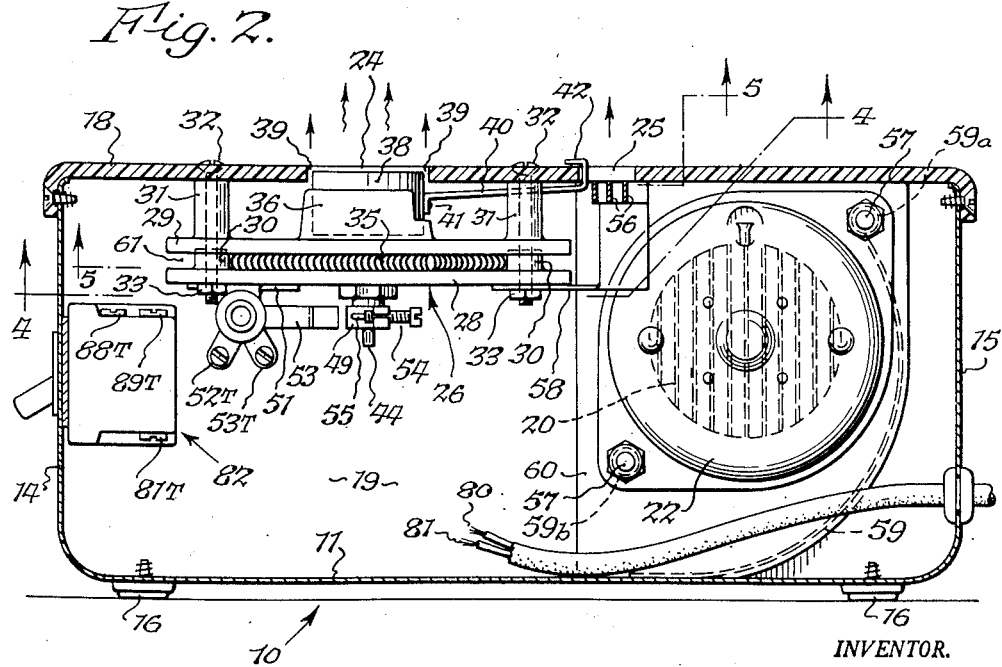
INVENTOR.
Edward A. Ebert April 16, 1957   E. A. EBERT   2,789,200
AIR TEMPERING DEVICE Filed May 19, 1955   3 Sheets-Sheet 2

INVENTOR.
Edward A. Ebert

April 16, 1957  E. A. EBERT  2,789,200
AIR TEMPERING DEVICE
Filed May 19, 1955  3 Sheets-Sheet 3
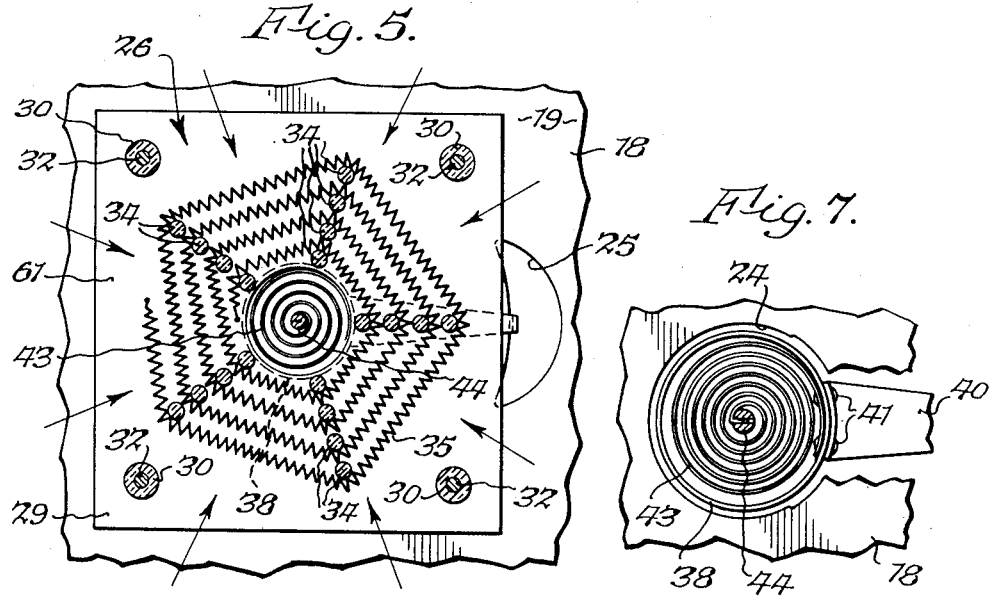
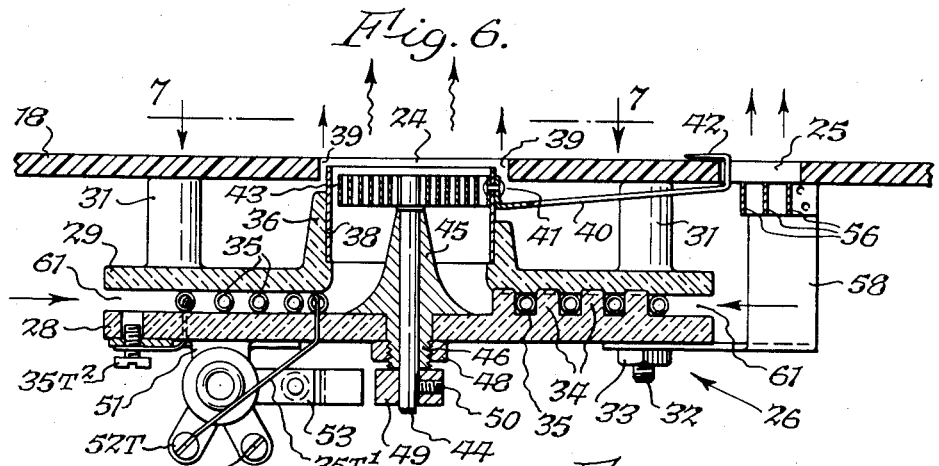
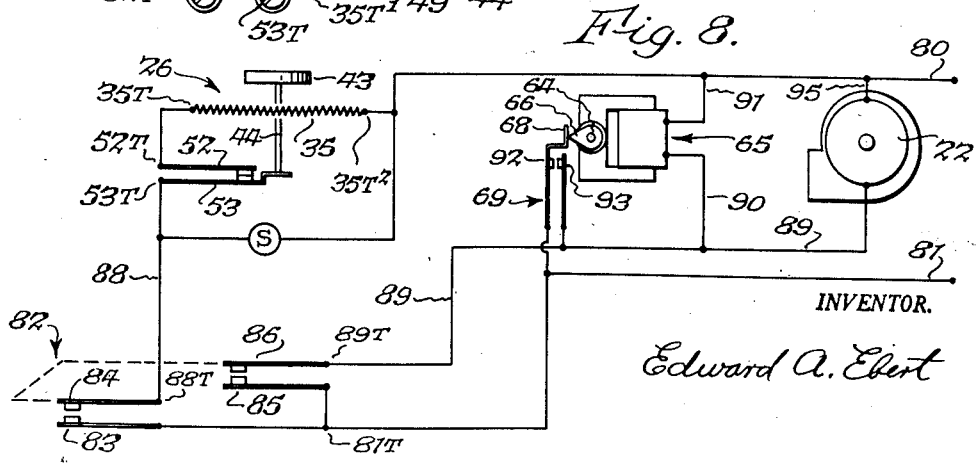
INVENTOR.
Edward A. Ebert United States Patent Office 2,789,200
Patented Apr. 16, 1957

2,789,200

AIR TEMPERING DEVICE

Edward A. Ebert, Snyder, N. Y.

Application May 19, 1955, Serial No. 509,616

18 Claims. (Cl. 219—39)

My invention relates to a device for providing a stream of heated air and a stream of cooling air, the first, to bring a workpiece up to a precise temperature and the second to return it back to a normal temperature. More particularly this device is useful in the optical profession in the fitting of eyeglass frames made of thermoplastic materials.

In this particular field many different materials and plastics are used in the manufacture of such frames, each having its own characteristics and softening temperatures. In forming these materials for fitting, it is necessary that this forming take place only after the material is soft enough and not before. If forming or bending takes place while the material is too cold, immediate fracturing will occur, or crazing and fracturing will occur at some later time, due to strains set up in the material. If the material is permitted to get too hot, drastic deforming takes place, and when excessive heat is applied the plastic will blow, i. e., vaporization inside the material takes place, and since the material is soft, bubbles will form, turning the material into a sponge or foam. When this stage is reached, the foam quickly scorches and the piece is ruined.

The present practice in this field is to use a common electric hot plate and hold the part over the plate for heating. It is very difficult to know when the part is properly heated and ready for bending or forming, so that the tendency is to try to form or bend the part before it is sufficiently heated or softened, since just a moment of exposure too long will ruin the part completely. This, of course, sets up strains in the part, and it will either fracture then, or craze or crack some time later. A further difficulty is that different colors absorb radiant heat at faster or slower rates, this adding to the difficulty of gaging the exposure time. Also, since radiant heat varies to the square of the distance from the source of heat, if the part is held too close to the hot plate, rapid heating occurs and the operator's timing is again misjudged. The above objections also apply to more modern radiant heaters which have recently made their appearance on the market, specifically for eyeglass frame fitting.

It is therefore a prime object of this invention to provide a heating device which will make possible thorough heating of a workpiece, such as a thermoplastic as an example, to an exact temperature, so that forming of the material can be accomplished at its most desirable forming temperature.

A second object is to heat the workpiece as fast as possible without danger of overheating it.

A third object is to provide cooling air to set the material of the workpiece and bring it back to normal room temperature quickly after it is formed or shaped or has had some other operation performed on it.

Another object is to provide a moving column of heated air which will have a uniform temperature throughout its cross section, and which will be maintained within close to its specific temperature setting.

A further object is to heat the delivered air within such a short period of time that the overshoot of the thermostatic control will occur so early that this overheated air can be availed of to heat the object or material faster and without danger of overheating, and yet will have stabilized to its closely regulated, set temperature by the time the object approaches its softening temperature.

Another object is to provide a timer connected to the electrical circuit which will indicate the passing of time from the moment the heat is turned on so that unnecessary time and current will not be wasted in heating an object or part beyond the time necessary to bring it to properly workable condition.

Another object is to provide a timer with a switch which will always return the timer to its zero setting and which is also availed of to energize the blower motor after the main switch is turned off, to provide cooling air to cool off the heater.

A still further object is to provide a construction which is low in height, which is reasonable in cost and which can be readily serviced and adjusted.

Another object is to so construct such a device whereby all of its exposed parts that might be contacted by an operator will be at normal room temperature, so as to be comfortable to the touch.

A further object is to provide a thermostat which senses the temperature of the heated air throughout its cross section just before it emerges from its delivery duct to contact the workpiece.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

Fig. 1 is a perspective of the device.

Fig. 2 is a longitudinal, vertical section taken along line 2—2, Fig. 1.

Fig. 5 is another horizontal section looking upwardly through the heating element and taken along line 5—5, Fig. 2.

Fig. 6 is an enlarged, vertical section taken through the heating unit, similar to section 2—2, Fig. 1.

Fig. 7 is an enlarged, fragmentary view of the bimetallic heat sensing element and lever.

Fig. 8 is an electrical circuit diagram of the electric components.

Figure 3:
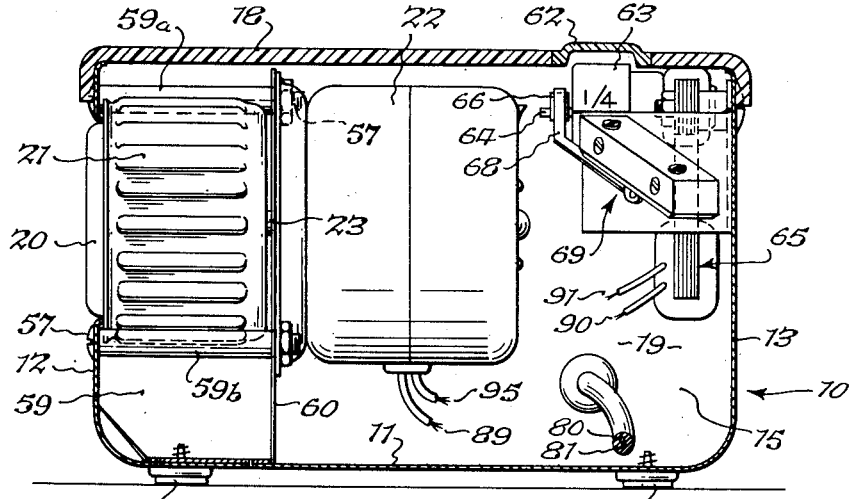
Fig. 3 is a vertical cross section taken along line 3—3, Fig. 1.

As shown in Figs. 1, 2 and 3, a casing 10 is provided having a bottom wall 11, side walls 12 and 13 and end walls 14 and 15. The bottom wall 11 may have four buttons or feet 16 located at each corner to prevent scratching any surface the device may be set upon.

A top wall 18, which is also a support or work surface and preferably of molded plastic, serves to provide an enclosed area 19 inside the casing 10 and is removably fastened to side and end walls by suitable fastenings. One of the side walls 12 is perforated with a grill covered, air inlet opening 20 and has mounted at its inner side a blower wheel 21. A blower motor 22 having a shaft 23 upon which the blower wheel 21 is mounted drives the blower wheel to draw air in through the opening 20 into the enclosed area 19 and provides this enclosure with air under pressure.

The top wall 18 is provided with an outlet opening 24 of circular cross section, and another 25 of crescent cross section. Mounted below the outlet opening 24 is a thermostatically controlled heating unit generally indicated by the numeral 26. This heating unit comprises a bottom ceramic plate 28 and a top ceramic body 29 spaced one from the other by the four tubular portions 30 which rise from the bottom ceramic plate 28. The top ceramic body 29 has four similar tubular portions 31 which are alined with the portions 30 so as to provide spacing and mounting means for the top body from the top wall 18 of the casing 10. Countersunk, oval head screws 32 pass through holes in the top wall 18 into the tubular portions 30 and 31 of the top ceramic body 29 and the bottom ceramic plate 28, and with nuts 33 securely mount the heating unit to the top 18. The tubular portions 31 also serve as insulators to prevent the passing of heat to the top wall 18 from the heating unit 26.

Integral bosses 34 rise from the bottom ceramic plate 28 and set into companion recess in the top ceramic body 29 to form a spiral pattern for a coiled heating element 35. As clearly shown in Figs. 5 and 6, the heating element 35 is spirally wound around the bosses 34 so as to present a configuration of equal heating surfaces of equal amount to any air that passes radially in towards the center thereof. At its center the top ceramic body 29 projects upwardly to provide a cylindrical duct 36 in which a short metal cylinder 38 is rotatably contained. This cylinder 38 projects into the circular opening 24 of the top wall 18 of the casing 10. The opening 24 is of larger diameter than the cylinder 38 so that this cylinder 38 does not contact the sides of the opening 24 when it is centered in the opening. Thus, a ring-shaped opening 39 is provided surrounding the cylinder 38, the purpose of which will be explained later.

Figure 4:
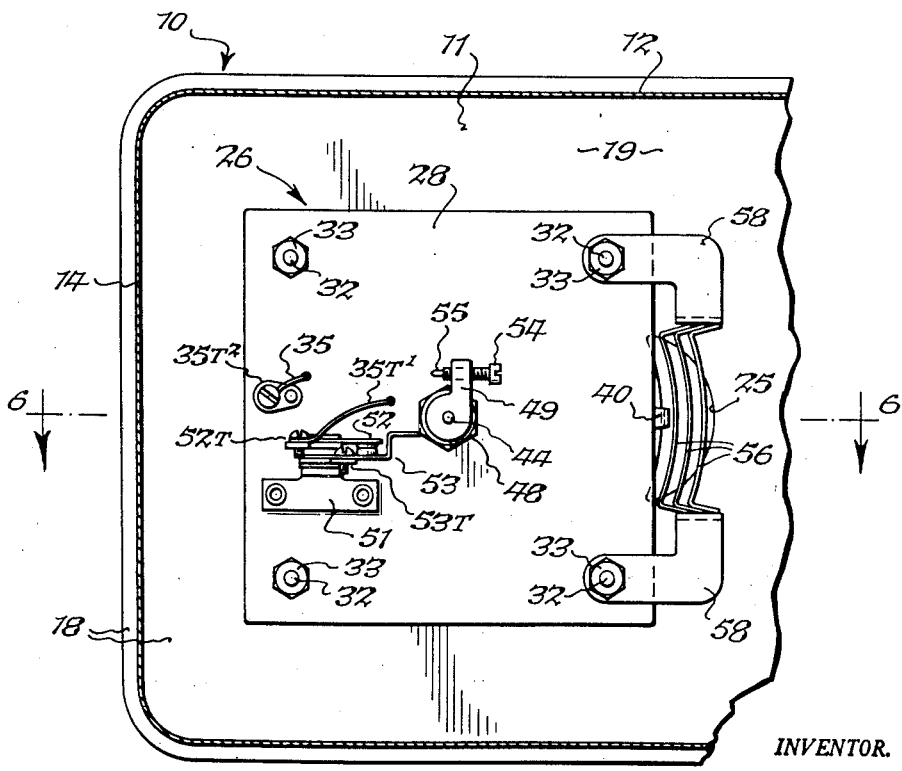
Fig. 4 is a horizontal section looking upwardly and taken along line 4—4, Fig. 2.

In Fig. 6 an indicator arm 40 is shown having one end fast to the side wall of the cylinder 38 by means of rivets 41 and having its other end projecting up through the crescent-shaped opening 25. A reverse bend is then made in this arm 40 to form a pointer 42 which registers with indicia embossed on the top surface of the top wall 18. The rivets 41 also make fast to the cylinder 38 one end of a spiral of a bimetallic heat sensing element 43. At the center of its spiral the bimetallic element 43 is made fast in a slot provided in the uppermost end of a vertical shaft 44, as best shown in Fig. 7, which is journalled in a cone-shaped bearing member 45, mounted in the bottom ceramic plate 28 by means of a threaded extension 46 and nut 48. A lever arm 49 is fastened to the shaft 44 and held thereon by a set screw 50. The bottom plate 28 also has mounted on its lower face a bracket 51 which carries a pair of normally closed electrical switch blades 52 and 53, most clearly shown in Figs. 2, 4 and 6. The lever arm 49 as shown in Figs. 2, 4 and 6 is positioned so as to engage the switch blade 53 when rotated in a counterclockwise direction, as viewed in Fig. 4, to open the contacts by an adjustable screw 54 having a tip 55 of insulating material. The adjustable screw 54 is provided to calibrate the thermal bimetallic element 43 and the indicator arm 40 and its pointer 42 to read accurately with the indicia embossed on the top wall 18. All of the above mentioned parts 40 through 55 form an adjustable thermostat that will control and regulate the temperature of air heated by the element 35 that passes upwardly through the metal cylinder 38. Louvers 56 are preferably provided on the underside of the crescent-shaped outlet opening 25, having legs 58 which are bent and fastened under the nuts 33 of the screws 32.

Although not essential, the blower wheel 21 may be provided with a scroll 59 and side plate 60. As shown in Figs. 2 and 3, the scroll 59 is curled to provide a spacer tube 59a for one of a pair of screws 57. Another tubular spacer 59b is also provided for the lower screw 57. The spacers 59a and 59b with the scroll 59 and side plate 60 form a scroll casing with the side wall 12 for the blower wheel to rotate in. A flange on the motor 22 has matching holes for the screws 57, and when the nuts of the screws 57 are tightened the whole assembly forms a scroll and mounting for the blower and motor.

As will now be readily understood with the above mentioned elements, if current is provided to the heating element 35 and blower motor 22, air pressure will develop in the casing 10 and escape out of the openings 24 and 25. Since the opening 25 is directly connected to the enclosure area 19, air of the same temperature, that is unheated room air, as that drawn in through the fan outlet 20, will be discharged. Also since the ring-shaped opening 39 is directly connected to the enclosure, it will discharge air of the same temperature, i. e., unheated air of room temperature, except for what heat it will pick up that is lost to it through contact with the top ceramic body 29, which is what is intended it do, to prevent the underside of the top wall 18 from getting hot.

The volume of air provided by the blower 21 is in excess of that discharged through these two openings, namely the crescent-shaped opening 25 and the ring-shaped opening 39, so that air flows radially into the heating unit 26 past the heating element 35 where it is raised to the required temperature, then up through the metal cylinder 38, past the bimetallic heat-sensing element 43, and out of the opening 24. When the air temperature exceeds the temperature that the arm 40 and pointer 42 are set to, the lever arm 49 and its screw 54 and tip 55 engage the switch blade 53 and open the contact between it and the blade 52 and thus deenergize the heating element 35. As the heating element 35 loses its residual heat, the bimetallic spiral will sense the temperature of the air flowing past it and again let the switch blades 52 and 53 contact each other to provide current to the heating element 35 to again heat the air.

It is most important in designing a heating unit for the purposes set forth that the heating element have a minimum of contact with its mounting so that the mounting does not delay the heating of the element by absorption of its heat and conversely that the mounting has a minimum of residual heat when the heating element is deenergized. This makes for a quick heating of the air and avoiding an unnecessarily large mass to cool. Another requisite is to provide uniform heating of all of the air i. e., it must be impossible for any air to get past the heating element without being heated, and no air must be overheated. The spiral configuration of my heating element 35 between the upper ceramic body 29 and the lower ceramic plate 28 obtains this result.

Another requirement is to have a thermostatic element which will not be cooled by its mechanical mounting (through which it loses its heat) and one that will have a maximum of its area in the path of the air stream to quickly sense its temperature. Also, a thermostatic element should be distributed throughout the air stream to make it possible for it to sense the temperature in any part of the air stream's cross section. This is also attained by my spiral, bimetallic, heat-sensing element 43. Another advantage of this construction as shown, is that it senses all of the air just before it leaves the cylinder 38, and the heat-sensing element itself provides a grill or guard over the discharge opening to prevent the entrance of unwanted objects.

As will be apparent, the unheated air enters the space 61 between the body 29 and plate 28, radially, is heated by the heating element 35, and is then turned upwardly by the conical bearing member 45 which it warms by contact, and is then directed past the heat-sensing, bimetallic element 43. This hot air will also heat the cylinder 38 to which the bimetallic element 43 is fastened. Since both of the fastenings of the bimetallic element 43 are warmed, the thermostat 43 will sense the temperature of the air more accurately.

In Figs. 1 and 3, the numeral 62 indicates a lens or window positioned over a time indicator drum 63. This drum 63 is marked in one quarter increments of a minute, i. e. ¼, ½, ¾ and one minute, and is mounted on a shaft 64 of a 1 R. P. M. clock motor designated at 65. The shaft 64 is also provided with a cam 66 which is engaged by the leaf 68 of a normally closed switch 69. Cam 66 actuates the switch 69 so as to always return the time indicator drum to zero position, and is also used to automatically provide cooling air to cool off the heating unit 26 after it is deenergized, as will be more fully explained.

Reference is now made to the electrical circuit diagram of Fig. 8. For example, 115 volts A. C. may be supplied to the lines 80 and 81. When the main switch 82 is thrown to "on" position, it being a single throw, two-pole switch, the contacts 83 and 84 are closed, as are its other contacts 85 and 86. Current then flows through the line 88 to the terminals 52T and 53T of the switch blades 52 and 53, which are now closed, through the terminal 35T heating element 35 to terminal 35T² to the other side of the line 80. Current also flows from the switch contact 86 to the line 89 to the line 90 of the clock motor 65, then to line 91 to the other side of the line 80, and also from line 89 to the blower motor 22, line 95 to the other side of the line 80. Thus the heater 35, the clock motor 65 and the blower motor 22 are energized and set in operation.

When the air temperature reaches a preset temperature, the heat-sensing element 43 opens the contacts of the switch blades 52 and 53, and closes them to maintain a uniform, tempered discharge of air from the cylinder 38. After about one-eighth minute has passed contacts 92 and 93 of the clock motor switch 69 close. This switch 69, it will be observed, is directly across the contacts 85 and 86 of the main switch 82. Therefore, if the operator has finished heating the workpiece, he throws the switch 82 to "off" position, thereby deenergizing the heating element 35. Current, however, will continue to flow to the blower motor 22 and the clock motor 65 until its cam 66 rotates to the position where it opens contacts 92 and 93 of the switch 69. This continuation of the air flow cools off the heating element 35, and the cam returns the indicator drum 63 to zero position. A signal lamp S is connected across the lines 80 and 81 whenever the contacts 83 and 84 of the main switch 82 are closed, indicating energization of the heating element 35, clock motor 65 and blower motor 22. The operator can then tell when the device is operative with heat or just in its cooling off cycle.

*Operation*

As an example, in use the operator can identify the particular plastic used in the eyeglass frames he sold to his customer from his source of supply and thereby knows the proper temperature to use, and set the pointer 42 of this device for this temperature. He now places that portion to be bent or formed over the opening 24 and throws the switch 82. After observing the passage of the proper amount of time for that particular part, depending on its mass, he then proceeds to bend the portion to the conformity desired. The formed portion may then be held over the opening 25 to cool or freeze it into rigid form, whereupon it is then immediately ready to be placed upon the person for fit. In the meantime he may or may not have thrown off the switch 82. However, when he is finished forming and fitting, he will throw off the switch 82, thereby cutting off current to the heating element 35. As before explained, the switch 69 being closed, will continue to supply current to the fan motor 22 to cool off the heating element 35 and also will supply current to the clock motor 65 until the cam 66 opens the contacts 92 and 93 of switch 69, whereupon both the clock motor 65 and fan motor 22 are deenergized.

If, for any reason, the operator should be taken away from the machine, while leaving the part on the machine with the heat on, no harm will come to the workpiece, since it cannot be overheated or scorched because of the thermostatic air temperature control. Normally to heat an object fast, air at a higher temperature than the final temperature of the object could be used, but in this use it would never be known when the scorch point was reached to cut down the air temperature by readjusting the thermostat. Therefore, it is necessary to use heating air always below the scorch temperature. However, if while the part is still relatively cool we use the overshoot of the thermostat, we can exceed by a considerable margin this top scorch temperature and thereby accelerate heating and reduce the time interval. This device will raise the temperature of air starting at 60 degrees F. to 385 degrees F. in approximately 14 seconds, and within another ten seconds settle back to its setting of 285 degrees. Thus high temperature air heats the relatively cool object when there is no danger of scorching, and when the object approaches its final temperature the thermostat controls the air at below the scorching point of the plastic. This is accomplished by taking advantage of a quick heating element and designing the overshoot of a thermostat to occur very early in its cycle. This, and the fact that the object can be cooled quickly by the cool air from the opening 25, permit the fitting to be accomplished in a much shorter time interval than heretofore. Also spoiling of the parts worked upon through over or underheating is eliminated.

From the foregoing it will be apparent that the device illustrated and described provides for an operator, for example, an optician, a tool with which he can soften plastic eyeglass frames without fear of scorching, for fitting to an individual. The device makes the plastic moldable and also makes it possible to set it in the shortest possible time, so that it may be tried for fit at a comfortable temperature on the individual. It does this with a much smaller consumption of current than has been possible with previously available equipment, and it gives the optician additional aid as to the time required for heating or cooling a part by the time indicator provided. Also advantage is taken of the timer to provide cooling of the heating element and return of the timer to a zero reading. At all times all parts of the device are attractive in appearance and comfortable to the touch.

In the specification I have explained the principles of my invention and the best mode in which I have contemplated applying those principles, so as to distinguish my invention from other inventions; and I have particularly pointed out and distinctly claimed the part, improvement or combination which I claim as my invention or discovery. While I have shown and described certain preferred embodiments of my invention, it will be understood that modifications and changes may be made without departing from the spirit and scope thereof, as will be clear to those skilled in the art.

I claim:

1. A device for heating in the open atmosphere an article to a temperature not exceeding a maximum value, comprising a hollow casing forming a support for supporting said article in the open atmosphere adjacent the exterior of said casing, said casing having an air outlet opening from its interior through its wall to the open atmosphere and in line with the article so supported, means arranged to sustain a higher than atmospheric air pressure within said casing and having its inlet communicating with the open atmosphere and its outlet communicating with the interior of said casing to effect an outward movement of air through said outlet opening, an electrical heating element within said casing in the path of the air about to pass through said outlet opening, and a thermostat in circuit with and controlling said heating element and having its sensing element in the path of the air leaving said heating element and about to enter said outlet opening and operative to provide said temperature.

2. A device as set forth in claim 1, wherein said outlet opening is through the horizontal top wall of said casing whereby said horizontal top wall of said casing forms said support.

3. A device as set forth in claim 2, wherein means detachably connect said top wall to the side walls of said casing.

4. A device as set forth in claim 2, wherein means suspend said heating element from said horizontal top wall.

5. A device as set forth in claim 4, wherein means suspend said thermostat from said horizontal top wall and wherein the sensing parts of said thermostat are interposed between said heating element and outlet opening.

6. A device as set forth in claim 4, wherein said thermostat is mounted on said means suspending said heating element.

7. A device for heating in the open atmosphere an article to a temperature not exceeding a maximum value, comprising a hollow casing having a horizontal top wall forming a support for supporting said article in the open atmosphere, said horizontal top wall having an air outlet opening from the interior of said casing to the open atmosphere and in line with the article so supported, means arranged to sustain a higher than atmospheric air pressure within said casing and having its inlet communicating with the open atmosphere and its outlet communicating with the interior of said casing to effect an outward movement of air through said casing and its outlet opening, a lower horizontal plate mounted in said casing below said outlet opening, an upper horizontal plate arranged above and in spaced relation to said lower horizontal plate and having a central opening communicating with said outlet opening, an electrical heating element interposed between said plates and arranged in the horizontal path of air flowing from the interior of said casing between said plates toward said central opening and out through said central and outlet openings, and a thermostat in circuit with and controlling said heating element and having its sensing element in the path of the air leaving said heating element and about to enter said outlet opening and operative to provide said temperature.

8. A device as set forth in claim 7, wherein a vertical duct rises from the central part of said upper plate around said central opening, and wherein said heat-sensing element is arranged within said duct.

9. A device as set forth in claim 8, wherein said heat-sensing element is in the form of a bimetallic spiral extending horizontally across the entire interior of said duct so as to be influenced by substantially all parts of the stream of heated air passing through said duct.

10. A device as set forth in claim 8, wherein said outlet opening is of larger size than said vertical duct and wherein said air pressure sustaining means sustains a higher than atmospheric pressure around the exterior of said duct to provide an annular stream of relatively cool air surrounding and travelling with the heated air discharged from said duct through said outlet opening.

11. A device as set forth in claim 8 wherein said vertical duct includes a central sleeve rotatable about a vertical axis, wherein said sensing element is in the form of a spiral having its inner end operative to make and break a circuit through said heating element and has its outer end fixed to said rotatable sleeve, and wherein manually operable means are provided to move said rotatable sleeve to different set positions.

12. A device as set forth in claim 11, wherein said manually operable means comprises an arm fast to said tubular sleeve and having its free end extending upwardly through an elongated opening in said top wall, and wherein said free end forms a handle for adjusting said sensing element.

13. A device as set forth in claim 11, wherein the inner end of said spiral sensing element is fast to a vertical shaft journalled in said support for said heating element, wherein an arm is fast to the lower end of said shaft, and wherein an arm is operative to open and close a pair of contacts in circuit with said heating element.

14. A device as set forth in claim 13, wherein said arm carries a screw at its outer end and wherein said screw to open and close said pair of contacts and wherein the adjustment of said screw adjusts the relation between the opening and closing of said pair of contacts to said manually operable means.

15. A device as set forth in claim 1, wherein the entire interior of said casing is maintained at a higher than atmospheric pressure by said air pressure sustaining means, and wherein said casing has a second air outlet opening from its interior through its wall to the open atmosphere through which relatively cool air from the interior of said casing escapes to permit of cooling said article.

16. A device as set forth in claim 1, wherein the entire interior of said casing is maintained at a higher than atmospheric pressure by said air pressure sustaining means, and wherein said heating element is carried by a support having a duct conducting the heated air from said heating element toward said outlet opening, and wherein said outlet opening is larger than said duct to provide an annular stream of relatively cool air surrounding and travelling with the heated air discharged from said duct through said outlet opening.

17. A device as set forth in claim 1, wherein said air pressure sustaining means comprises a centrifugal blower wheel and an electric motor driving said blower wheel, and wherein said motor and blower wheel are wholly housed within said casing with the center of said centrifugal blower wheel in line with an air inlet opening in the wall of said casing.

18. A device for heating in the open atmosphere an article to a temperature not exceeding a maximum value, comprising a hollow casing forming a support for supporting the article in the open atmosphere adjacent the exterior of said casing, said casing having an air outlet opening from its interior through its wall to the open atmosphere and in line with the article so supported, means arranged to sustain a higher than atmospheric air pressure within said casing and having its inlet communicating with the open atmosphere and its outlet communicating with the interior of said casing to effect an outward movement of air through said outlet opening, an electric motor actuating said air pressure sustaining means, an electrical heating element within said casing in the path of the air about to pass through said outlet opening, a visual timer indicating the passage of time and driving a zero return cam, a second electric motor driving said visual timer, a manual single-throw, two-pole switch with a first and a second pair of contacts, with one contact of both pairs connected with one side of the line and with the other contact of said first pair being connected through said electrical heating element with the other side of the line, and with the other contact of said second pair being connected through both of said motors to the other side of said line with said motors in parallel with each other, a switch actuated by said zero return timer cam and connected across said second pair of contacts, and a thermostat in circuit with and controlling said heating element and having its sensing element in the path of the air leaving said heating element and about to enter said outlet opening and operative to determine said temperature.

References Cited in the file of this patent
UNITED STATES PATENTS

| | | |
|---|---|---|
| 1,973,347 | Kelly | Sept. 11, 1934 |
| 2,027,605 | McCord et al. | Jan. 14, 1936 |
| 2,675,460 | Winner | Apr. 13, 1954 |
| 2,689,372 | Goulding et al. | Sept. 21, 1954 |